US011373112B2

(12) United States Patent
Higa et al.

(10) Patent No.: US 11,373,112 B2
(45) Date of Patent: Jun. 28, 2022

(54) QUANTUM COMPUTER BASED METHOD FOR ANALYZING CYBER DATA AND SPECTRA WHILE PERFORMING OPTIMIZATION BASED ON THE ANALYSIS

(71) Applicant: Naval Information Warfare Center, Pacific, San Diego, CA (US)

(72) Inventors: Brian A. Higa, San Diego, CA (US); Kenneth S. Simonsen, San Diego, CA (US); Osama M. Nayfeh, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 421 days.

(21) Appl. No.: 16/751,339

(22) Filed: Jan. 24, 2020

(65) Prior Publication Data

US 2021/0232961 A1     Jul. 29, 2021

(51) Int. Cl.
*G06N 10/00* (2022.01)
*G06F 15/78* (2006.01)

(52) U.S. Cl.
CPC ......... *G06N 10/00* (2019.01); *G06F 15/7867* (2013.01)

(58) Field of Classification Search
CPC ........ H03K 19/195; H03K 17/92; H03K 3/38; G06N 10/00; G06N 10/20; G06N 10/40; G06N 10/60; G06N 10/80; H04L 4/147
See application file for complete search history.

(56) References Cited

U.S. PATENT DOCUMENTS

| | | | |
|---|---|---|---|
| 7,876,248 B2 * | 1/2011 | Berkley | B82Y 10/00 385/123 |
| 9,218,567 B2 * | 12/2015 | Macready | G06N 10/00 |
| 9,755,133 B1 | 9/2017 | Nayfeh et al. | |
| 9,978,020 B1 | 5/2018 | Gambetta et al. | |
| 10,133,986 B1 | 11/2018 | Newton et al. | |
| 10,467,543 B2 * | 11/2019 | Macready | B82Y 10/00 |
| 11,100,416 B2 * | 8/2021 | Lanting | G06N 10/00 |

(Continued)

OTHER PUBLICATIONS

Moghal, M.R., et al., "Spectrum Optimization in Cognitive Radios using Elitism in Genetic Algorithms," International Conference on Emerging Technologies, 2010, pp. 49-54.

(Continued)

*Primary Examiner* — Jason Crawford
(74) *Attorney, Agent, or Firm* — Naval Information Warfare Center Pacific; Kyle Eppele

(57) ABSTRACT

A method useful for network and spectrum defense which operates to analyze cyber data and spectra while performing real time optimization which is based on the analyzed cyber data or spectrum. The method utilizes quantum computing and reconfigurable qubits with built-in memory to sample a target cyber data or spectrum, search through the sample and determine a desired or required network or spectrum reallocation, and determine optimal values for its order parameters and Hamiltonian and tune the qubits in accordance with the determination. An embodiment may provide for spectrum optimization that minimizes frequency bandwidth, power, and bit error rate. The desired or required network or spectrum reallocation and optimal values order parameters and Hamiltonian may be stored in the built-in memory to facilitate machine learning.

20 Claims, 3 Drawing Sheets

(56) References Cited

U.S. PATENT DOCUMENTS

| | | | |
|---|---|---|---|
| 2016/0034423 A1 | 2/2016 | Hastings et al. | |
| 2016/0338075 A1 | 11/2016 | McKibben | |
| 2019/0164059 A1 | 5/2019 | Denchev et al. | |
| 2020/0396617 A1* | 12/2020 | Clark | H04W 24/02 |
| 2021/0232960 A1* | 7/2021 | Scott N. | G06N 5/003 |
| 2021/0232961 A1* | 7/2021 | Higa | H04L 43/022 |

OTHER PUBLICATIONS

Ciani et al., "Hamiltonian quantum computing with superconducting qubits," Quantum Science and Technology 4, No. 3 (2019): 035002.

Vissers, et al., "Implementing quantum stochastic differential equations on a quantum computer," Quantum Infomation Processing 18, No. 5 (2019): 152.

Daryanoosh, S. et al., "Quantum master equations for entangled qubit environments," Physical Review A 98, No. 6 (2018): 062104.

Tabakin, Frank, "Model dynamics for quantum computing," Annals of Physics 383 (2017), pp. 33-78.

Kropf, C., et al., "Open system model for quantum dynamical maps with classical noise and corresponding master equations," Open Systems & Information Dynamics 24, No. 04 (2017): 1740012.

Alvarez-Rodriguez, U. et al., "Quantum artificial life in an IBM quantum computer," Scientific reports 8 (2018).

Nayfeh, O., et al., "Nonvolatile and Cryogenic Compatible Quantum Memory Devices," SSC Pacific Technical Report 3016, 2016.

Newton, C. et al., "Superconductor-ionic quantum memory devices," In 2016 74th Annual Device Research Conference (DRC), IEEE, 2016, pp. 1-2.

Nayfeh, O., et al., "Generation of Quality Pulses for Control of Qubit/Quantum Memory Spin States: Experimental and Simulation," No. TR-3046. Space and Naval Warfare Systems Center Pacific San Diego CA San Diego, 2016.

Wehner, S., et al., "Quantum internet: A vision for the road ahead," Science 362, No. 6412 (2018).

Boixo, S., et al., "Characterizing quantum supremacy in near-term devices," Nature Physics 14, No. 6 (2018): 595.

Peterer, M. J., et al., "Coherence and Decay of Higher Energy Levels of a Superconducting Transmon Qubit," Physical Review Letters, vol. 114, No. 1 (2015), 010501.

Jiang, S. et al., "Quantum annealing for prime factorization," Scientific reports 8, No. 1 (2018): 17667.

Pant, M., et al., "Routing entanglement in the quantum internet," npj Quantum Information 5, No. 1 (2019).

Wang, XinMei, "Quest towards factoring larger integers with commercial D-Wave quantum annealing machines," Science China Physics, Mechanics & Astronomy 62, No. 6 (2019): 960331.

Arenz, C., et al., "Controlling qubit networks in polynomial time." Physical review letters 120, No. 22 (2018): 220503.

* cited by examiner

QUANTUM COMPUTER BASED METHOD FOR ANALYZING CYBER DATA AND SPECTRA WHILE PERFORMING OPTIMIZATION BASED ON THE ANALYSIS

STATEMENT OF GOVERNMENT INTEREST FEDERALLY SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif. 92152; telephone (619) 553-5118; email: ssc_pac_t2@navy.mil. Reference Navy Case No. 104218.

CROSS REFERENCE TO RELATED APPLICATIONS

This application is related to the following issued patents: U.S. Pat. No. 9,755,133, entitled "Reconfigurable, Tunable Quantum Qubit Circuits with Internal, Nonvolatile Memory" and issued on Sep. 5, 2017, and U.S. Pat. No. 10,133,986 entitled "Quantum Computing with Photonic/Ionic Tuning of Entanglement" and issued on Nov. 20, 2018, are hereby incorporated by reference herein in their respective entireties for their respective teachings.

BACKGROUND OF THE INVENTION

Field of the Invention

This disclosure relates generally to the use of quantum computing to provide for real time cyber and spectra analysis and optimization.

Description of the Prior Art

As traffic on networks increases and the availability of radio spectrum resource decreases, the need for real time analysis of networks and spectra as well as the real time programming of active components, such as radios, is becoming more pronounced. But because of the computing power demands for such operations due in part to the flow of data, the practical requirements for such operations have begun to push the practical limitations of available computing technology. Indeed, a commonality shared by such real time analysis of networks and spectra or real time programming of active components is the way the data flows in or out and the need for further improvement due to limitations in conventional technology.

For example, spectrum optimization using cognitive radios ("CRs") is in high demand because of the decreasing spectrum availability. CRs identify, predict, and anticipate available frequencies in a dynamic radio environment. Optimization techniques need to be real time and able to adapt to complex and dynamic radio environments. Genetic Algorithm ("GA") is an optimization technique that can meet these needs. With the increasing complexity of radio environments, however, the requirements for optimization techniques are approaching the limits of conventional computing. Computational time for GA can get too long for very complex radio environments. Quantum computing has not been substantially explored to benefit CRs. Quantum computing can be utilized to shorten computational time for GA and enable CRs to operate in more complex radio environments with significantly increased re-configurability due to the exponential effect that modifying a qubit's coupling strength with other qubits has.

In another example, Software Defined Radios ("SDRs") are in high demand because of their versatility to reconfigure their operating characteristics such as bandwidth, frequency, modulation, and sampling rate via software. There is always a need to extend capabilities of SDRs to achieve better performance such as higher frequency, wider bandwidth, and greater sensitivity. Cryogenics and quantum computing have not been substantially explored to benefit SDRs. Cryogenics and quantum computing have been demonstrated to greatly improve performance of some radio frequency ("RF") devices and components. Low noise amplifiers ("LNAs") made from cryogenic cooled superconductor material have been tested and shown to have lower noise figures compared to conventional LNAs. Cryogenic cooled RF filters have high quality factor ("Q") that can produce deep narrowband frequency excision with sharp cut off frequencies and very low loss in the passband. And as stated above, quantum computing is a powerful tool for optimization. Reconfigurable components such as field programmable gate arrays ("FPGA") and digital signal processing ("DSP") could benefit greatly from quantum computing. For example, it could operate to determine the optimum configuration that minimizes the number of gates used and maximize speed.

Accordingly, there remains a need for a system and method for analyzing cyber data as well as spectra for anomalies while optimizing the same which utilizes quantum computing technology. It would be desirable for such a system and method to employ memory technologies reconfigurable on the fly so as to be able to learn from the data and reconfigure as needed.

SUMMARY OF THE INVENTION

The present disclosure describes a method for real time cyber and spectra analysis and defense which utilizes a system architecture that includes quantum computers, quantum memory and data converters. The method for analyzing cyber data and spectra while performing optimization based on the analysis comprises the steps of: providing analysis data which corresponds to at least one of spectra data related to spectra activity and cyber data related to a network activity; searching, by a quantum computing module having a plurality of quantum qubit circuits and internal memory, the analysis data; determining, by the quantum computing module, at least one optimal spectrum allocation using results from the step of searching; based on the at least one optimal spectrum allocation from the step of determining, resolving, by the quantum computing module, optimal order parameters and an optimized Hamiltonian for the plurality of quantum qubit circuits of the quantum computing module; and programming at least one of the plurality of quantum qubit circuits of the quantum computing module based on the optimal order parameters and optimized Hamiltonian from the step of resolving.

DETAILED DESCRIPTION OF THE INVENTION

Described herein is a method useful for network and spectrum defense which operates to analyze cyber data and spectra while performing real time optimization which is based on the analyzed cyber data or spectrum. The method utilizes quantum computing and reconfigurable qubits with built-in memory to implement reconfiguration algorithms and ultimately determine and initiate a desired or required network or spectrum reallocation.

The method of the present disclosure may be implemented on a tunable quantum qubit circuit such as that disclosed in U.S. Pat. No. 9,755,133, entitled "Reconfigurable, Tunable Quantum Qubit Circuits with Internal, Non-volatile Memory" and issued on Sep. 5, 2017 (the '133 Patent hereinafter). This tunable quantum qubit circuit allows for on chip quantum circuits to be reconfigured with gate controllable order parameters $\Delta_i$ to alter the combined interaction energies $E_j$. In the present disclosure, the order parameters will be tuned based on either a desired active response or as a result of detection of an anomaly, each of which may be identified through a real time cyber and spectra analysis. Disclosed herein is the process and mathematical way that the reconfiguration can occur and how that is implemented on the tunable quantum qubit circuit.

Figure 1:
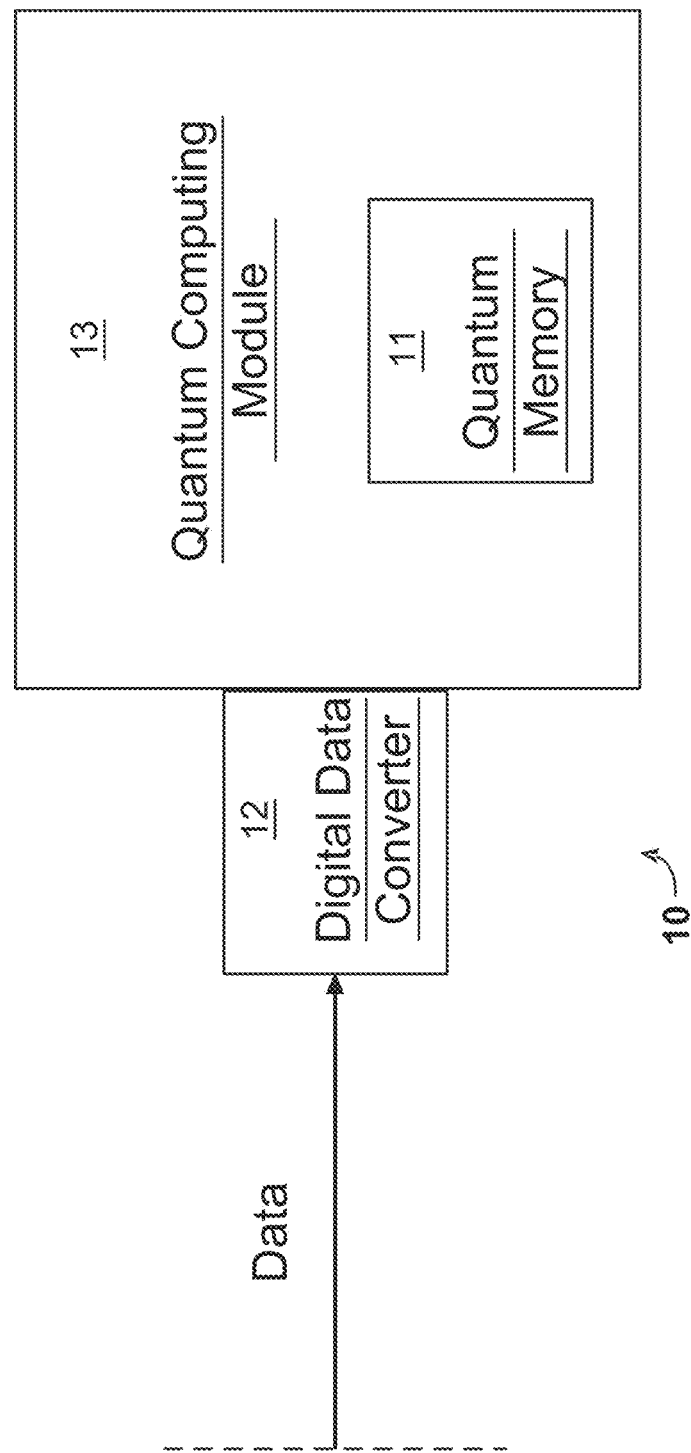
FIG. 1 shows a block diagram of the system architecture of a method for analyzing cyber data and spectra while performing optimization based on the analysis in accordance with the present disclosure.

Referring now to the drawings, and in particular, FIG. 1, a system 10 which operates to perform a method for analyzing cyber data and spectra while performing optimization based on the analysis utilizes a quantum memory 11, a digital data converter 12 and a quantum computing module 13 which may be embodied as a plurality of a quantum qubit circuits. Consistent with the tunable quantum qubit circuit in the '133 Patent, the quantum qubit circuits may comprise internal memory. As described below, the system 10 takes spectrum or cyber data chunks and analyzes the sampled data in real time while also enabling optimal reallocation of resources of the network or spectrum or detection of anomalies therein. The system 10 may also learn from the data and reconfigure as needed. In this manner, the system 10 may provide a design and working principle for a network and spectrum defense system.

Figure 2:
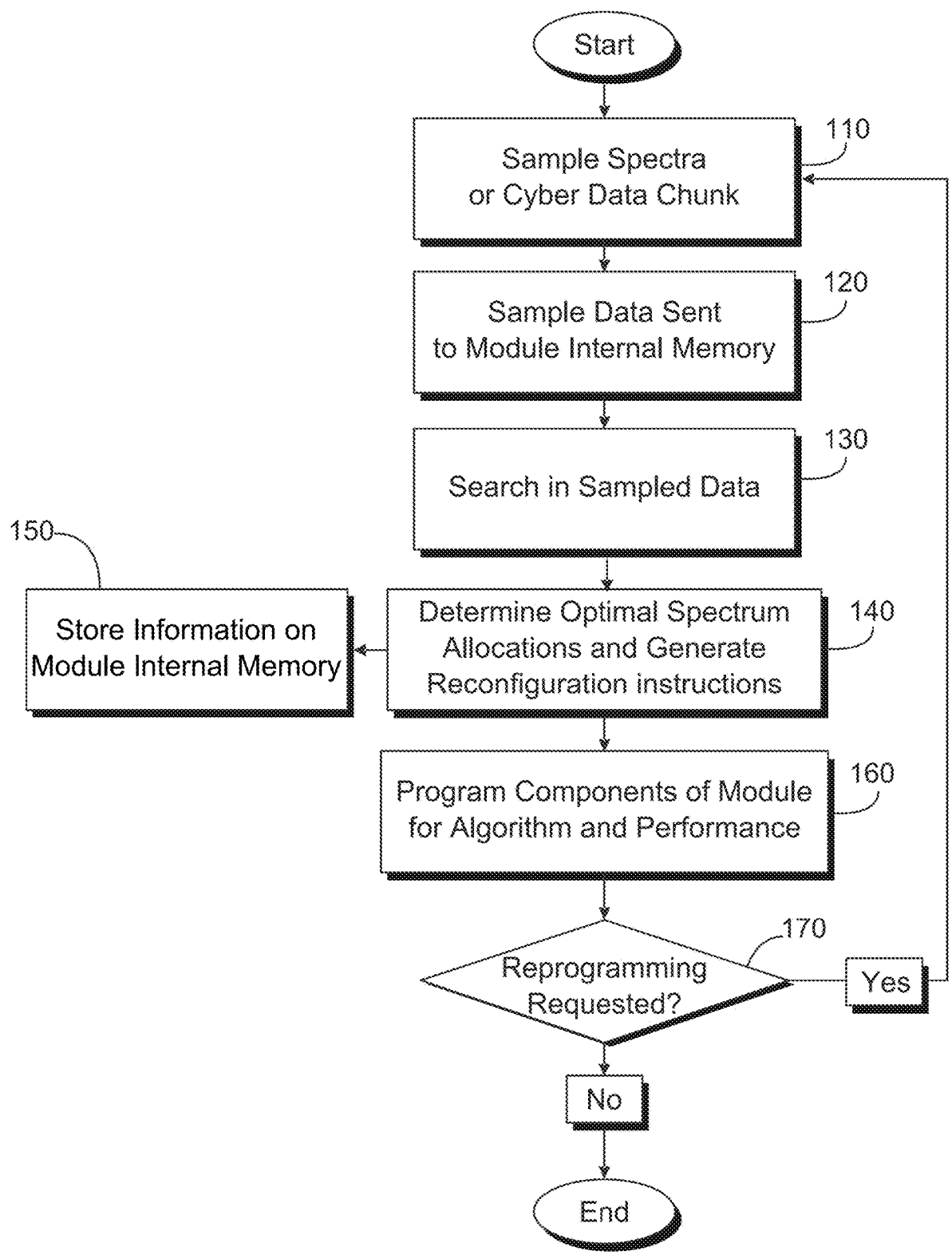
FIG. 2 shows the steps of a method for analyzing cyber data and spectra while performing optimization based on the analysis in accordance with the present disclosure.

Referring now to FIG. 2, a method for analyzing cyber data and spectra while performing optimization based on the analysis begins with wide band digitized spectra or cyber chunk data being sampled (sensed) in real time by an analog to digital converter at step 110. This sampling may be initiated by way of a request made through a software interface operatively integrated with the system 10. The request may direct a sampling of a spectrum or cyber data chunk of a quantum network.

It is contemplated that the analog to digital converter may be embodied as the digital data converter 12. Further, a data converter (sensor) may function via quantum methods.

The sampled data is then sent to internal memory of the quantum computing module 13 at step 120. As the sampled data is received by the quantum computing module 13, the quantum computing module 13 performs real time searches of the sampled data at step 130. This searching enables the quantum computing module 13 to identify the present allocation of the resources and other characteristics of the spectra or network being sampled. Furthermore, as the search continues, it may allow the quantum computing module 13 to identify anomalies in the spectra or network being sampled.

At step 140, the quantum computing module 13 determines the optimal spectrum allocations. The optimal spectrum allocations may be determined using an optimization algorithm along with a network performance function such as the following:

$$\text{Network performance function(spectrum or cyber chunk)} =$$

$$\lim_{error \to 0} \int_{BER=min}^{BER=max} d^3r \sum_{qubit\ i=1}^{qubit\ n} \Delta_i^*(r) \Delta_{i+1}^*(r) +$$

$$\int_{frequency=min}^{frequency=max} d^3r \sum_{qubit\ i=1}^{qubit\ n} \Delta_i^*(r) \Delta_{i+1}^*(r) +$$

$$\int_{power=min}^{power=max} d^3r \sum_{qubit\ i=1}^{qubit\ n} \Delta_i^*(r) \Delta_{i+1}^*(r)$$

As this function is utilized in the optimization algorithm in real time and as more and more data is sampled and made available in real time, it also allows the quantum computing module 13 to learn how to optimize the spectrum or network and its operation therewith, which may include determining the desired order parameters $\Delta_i$ and the optimization algorithm coefficients. These items may be stored in the internal memory of the quantum computing module 13 in order to facilitate machine learning at step 150.

The determined spectrum allocations may additionally be employed to tune and optimize the Hamiltonian (H) through an implementation of embodiments of quantum master equations:

$$H(t): Qubit\ i \to j = H(\text{power}(t), \text{freqency}(t), BER(t))$$

$$\dot{\rho}(\text{power, frequency, } BER, t) =$$

$$-\frac{1}{\hbar}[H(t), \rho(\text{power, frequency, } BER, t)] +$$

$$\sum_n \frac{1}{2}[2C_n\rho(t)C_n^+ - \rho(t)C_n^+C_n - C_n^+C_n\rho(t)]$$

$$\dot{\rho}(\text{power, frequency, } BER, t) = -\frac{1}{\hbar}\left[\sum_{qubit\ i \to j}^{j=maxqubit} H(\text{power, frequency, } BER, t),\right.$$

$$\left.\rho(t)\right] + \sum_n \frac{1}{2}[2C_n\rho(t)C_n^+ - \rho(t)C_n^+C_n - C_n^+C_n\rho(t)]$$

From what is determined to be the desired order parameters $\Delta_i$ and Hamiltonian, the quantum computing module 13 may also generate instructions for programming the reconfigurable qubits of the quantum computing module 13 with optimum quantum logic gate and algorithm coefficients. Using these instructions, the quantum computing module 13 may be programmed for the particular optimization algorithm in use and the desired network or spectrum performance at step 160. This programming may include tuning the order parameters $\Delta_i$ and the Hamiltonian by way of the logic gates of the qubit circuits of the quantum computing module 13.

It is appreciated that by utilizing qubits with built-in memory during steps 140, 150, and 160, information can be stored and processed and learned by the quantum computer in real-time while the optimization process occurs based on the detected spectrum or cyber chunk.

While steps 140, 150, and 160 may be performed iteratively (with increasing optimization with reconfigured qubit circuits in the quantum computing module 13), it is contemplated that following step 160, the system (10) may at some point request re-programming of the quantum computing module 13 at step 170. At this time, the quantum computing module 13 may also output the determined allocations or network instructions. At that point, the system 10 may start anew at step 110 with the sampling of wide band digitized spectra or cyber chunk data that is based on the previously determined allocations or network instructions.

Figure 3:
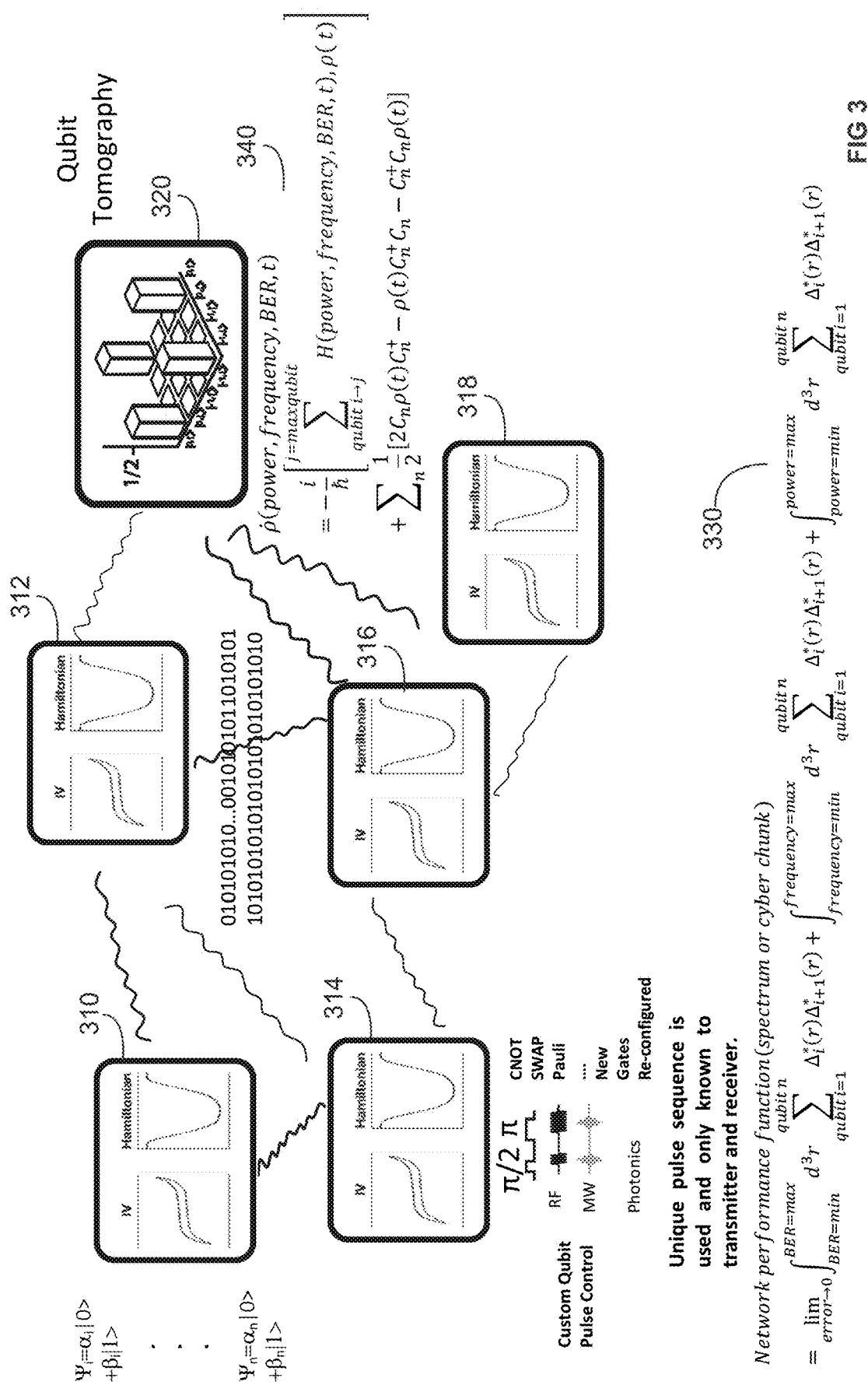
FIG. 3 depicts an example quantum computer/memory based network in accordance with the present disclosure.

FIG. 3 depicts an example quantum computer/memory based network in accordance with the present disclosure. As shown in FIG. 3, nodes 310, 312, 314, 316, and 318 accept incoming converter (sensory) information. The sensory information may program the ionic state of quantum memory arrays and the Hamiltonian of individual states. In accordance with the example of FIG. 3, the network may be linked via entanglement. A computation may be performed in a distinct manner among qubits that takes into consideration each individual Hamiltonian node. For example, results may be learned by a control machine that can then resend quantum information back to each node to learn. Individual nodes may be probed by tomography and IV to update the network. For example, node 320 shows "Qubit Tomography." As shown in FIG. 3, the network may use the network performance function 330 and the quantum master equation 340.

The approach disclosed herein provides a methodology for implementing reconfiguration algorithms that uses quantum computing and reconfigurable qubits with built-in memory. Leveraging the benefits of quantum computing, such as reduced computational time for spectrum optimization, as well as qubits which have built-in reconfiguration capability and memory, the Hamiltonian may be optimized to either provide the most efficient solution and/or to reconfigure based on the network or spectrum defense required to initiate network or spectrum reallocation. The example disclosed above provides for spectrum optimization that minimizes frequency bandwidth, power, and bit error rate (BER). Another advantage of quantum computing is that it can handle higher orders of magnitude compared to conventional computing.

The method disclosed herein provides for a quantum architecture that harnesses the power of quantum technologies and quantum information to address the needs of a real-time system for passive and active network and spectrum activity. Advantageously, this method provides for reduced data load as digital data is mapped to quantum information states, real time learning of anomalies via quantum computing, and reconfiguration of qubits based on optimized coefficients for a selected optimization algorithm. For example, the digital data may be dynamically mapped. For example, Hamiltonians determined from information sensed from a desired environment (e.g., spectrum/cyber data) may be controlled.

In an alternate embodiment, the method disclosed herein could be utilized to implement active components such as radios, guidance, and so forth. Further, it could be used for spectral intelligence such as predicting and anticipating dynamic radio environments.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method for analyzing cyber data and spectra while performing optimization based on the analysis, comprising the steps of:
   providing analysis data which corresponds to at least one of spectra data related to spectra activity and cyber data related to a network activity;
   searching, by a quantum computing module having a plurality of quantum qubit circuits and internal memory, the analysis data;
   determining, by the quantum computing module, at least one optimal spectrum allocation using results from the step of searching;
   based on the at least one optimal spectrum allocation from the step of determining, resolving, by the quantum computing module, optimal order parameters and an optimized Hamiltonian for the plurality of quantum qubit circuits of the quantum computing module; and
   programming at least one of the plurality of quantum qubit circuits of the quantum computing module based on the optimal order parameters and optimized Hamiltonian from the step of resolving.

2. The method of claim 1, wherein the step of providing includes sending the analysis data to the internal memory of the quantum computing module.

3. The method of claim 2, additionally comprising the step of sampling by an analog to digital converter the at least one of spectra data related to spectra activity and cyber data related to a network activity.

4. The method of claim 3, wherein the step of sampling generates the analysis data.

5. The method of claim 3, wherein the at least one of spectra data related to spectra activity and cyber data related to a network activity sampled by the analog to digital converter is stored in a discrete quantum memory.

6. The method of claim 1, additionally comprising the step of sampling by an analog to digital converter the at least one of spectra data related to spectra activity and cyber data related to a network activity.

7. The method of claim 6, wherein the step of sampling generates the analysis data.

8. The method of claim 6, wherein the at least one of spectra data related to spectra activity and cyber data related to a network activity sampled by the analog to digital converter is stored in a discrete quantum memory.

9. The method of claim 1, wherein the step of determining includes applying an optimization algorithm along with a network performance function.

10. The method of claim 1, wherein the step of resolving employs a quantum master equation in connection with the optimized Hamiltonian.

11. The method of claim 1, wherein at least a portion of information determined or resolved during the steps of determining or resolving is stored in the internal memory of the quantum computing module.

12. A method for analyzing cyber data and spectra while performing optimization based on the analysis, comprising the steps of:
   providing analysis data which corresponds to at least one of spectra data related to spectra activity and cyber data related to a network activity;

searching, by a quantum computing module having a plurality of quantum qubit circuits and internal memory, the analysis data;

determining, by the quantum computing module, at least one optimal spectrum allocation using results from the step of searching, wherein the step of determining includes applying an optimization algorithm along with a network performance function;

based on the at least one optimal spectrum allocation from the step of determining, resolving, by the quantum computing module, optimal order parameters and an optimized Hamiltonian for the plurality of quantum qubit circuits of the quantum computing module;

wherein the step of resolving employs a quantum master equation in connection with the optimized Hamiltonian; and programming at least one of the plurality of quantum qubit circuits of the quantum computing module based on the optimal order parameters and optimized Hamiltonian from the step of resolving.

13. The method of claim 12, wherein the step of providing includes sending the analysis data to the internal memory of the quantum computing module.

14. The method of claim 13, additionally comprising the step of sampling by an analog to digital converter the at least one of spectra data related to spectra activity and cyber data related to a network activity.

15. The method of claim 14, wherein the step of sampling generates the analysis data.

16. The method of claim 14, wherein the at least one of spectra data related to spectra activity and cyber data related to a network activity sampled by the analog to digital converter is stored in a discrete quantum memory.

17. The method of claim 12, additionally comprising the step of sampling by an analog to digital converter the at least one of spectra data related to spectra activity and cyber data related to a network activity.

18. The method of claim 17, wherein the step of sampling generates the analysis data.

19. The method of claim 17, wherein the at least one of spectra data related to spectra activity and cyber data related to a network activity sampled by the analog to digital converter is stored in a discrete quantum memory.

20. A method for analyzing cyber data and spectra while performing optimization based on the analysis, comprising the steps of:

sampling by an analog to digital converter at least one of spectra data related to spectra activity and cyber data related to a network activity that is stored in a discrete quantum memory, wherein the step of sampling provides analysis data which corresponds to the at least one of spectra data related to spectra activity and cyber data related to a network activity;

searching, by a quantum computing module having a plurality of quantum qubit circuits and internal memory, the analysis data;

determining, by the quantum computing module, at least one optimal spectrum allocation using results from the step of searching, wherein the step of determining includes applying an optimization algorithm along with a network performance function;

based on the at least one optimal spectrum allocation from the step of determining, resolving, by the quantum computing module, optimal order parameters and an optimized Hamiltonian for the plurality of quantum qubit circuits of the quantum computing module;

wherein the step of resolving employs a quantum master equation in connection with the optimized Hamiltonian;

programming at least one of the plurality of quantum qubit circuits of the quantum computing module based on the optimal order parameters and optimized Hamiltonian from the step of resolving; and wherein at least a portion of information determined or resolved during the steps of determining or resolving is stored in the internal memory of the quantum computing module.

\* \* \* \* \*